Patented July 25, 1939

2,167,519

UNITED STATES PATENT OFFICE 2,167,519

ELECTRON DISCHARGE DEVICE

William H. Manthorne, Bayshore, N. Y., assignor to Western Electric Company, Incorporated, New York, N. Y., a corporation of New York Application January 8, 1938, Serial No. 183,961

1 Claim.  (Cl. 250—27.5)

This invention relates to electron discharge devices and more particularly to vacuum tubes having elements positioned within the evacuated tubes and adjustable from without as to relative position within the tube.

Vacuum tubes having electrical elements (grids, filaments, plates, etc.) located within an evacuated container of glass, metal or both, are used in a large variety of circuits in a great variety of ways. Certain electrical characteristics of such tubes are largely dependent upon the relative position, either as to intervening distance or relative orientation or both, of two or more of the elements. In some cases it may be highly desirable to be able to adjustably alter the relative positions of two or more of the elements in order to controllably vary one or another electrical characteristic of the tube or device in question.

An object of the present invention is to provide simple, effective and reliable means to adjustably alter, by displacement or rotation or both, the position of one or more of the elements of a vacuum tube relatively to the body of the tube.

With the above and other objects in view the invention may be embodied in a vacuum tube in which a distortable corrugated metal tube, such as those known commercially under the trade-name "Sylphon", has an open end communicating with the evacuated body of the vacuum tube and has a closed end connected with one of the elements of the vacuum tube, together with means external to the vacuum tube and Sylphon to expand or contract the latter and thereby modify the position of the element with respect to the body of the vacuum tube.

Other objects and features of the invention will appear from the following detailed description of embodiments thereof taken in connection with the accompanying drawings in which the same reference numerals are applied to essentially identical parts in the several figures and in which—

Figure 1:
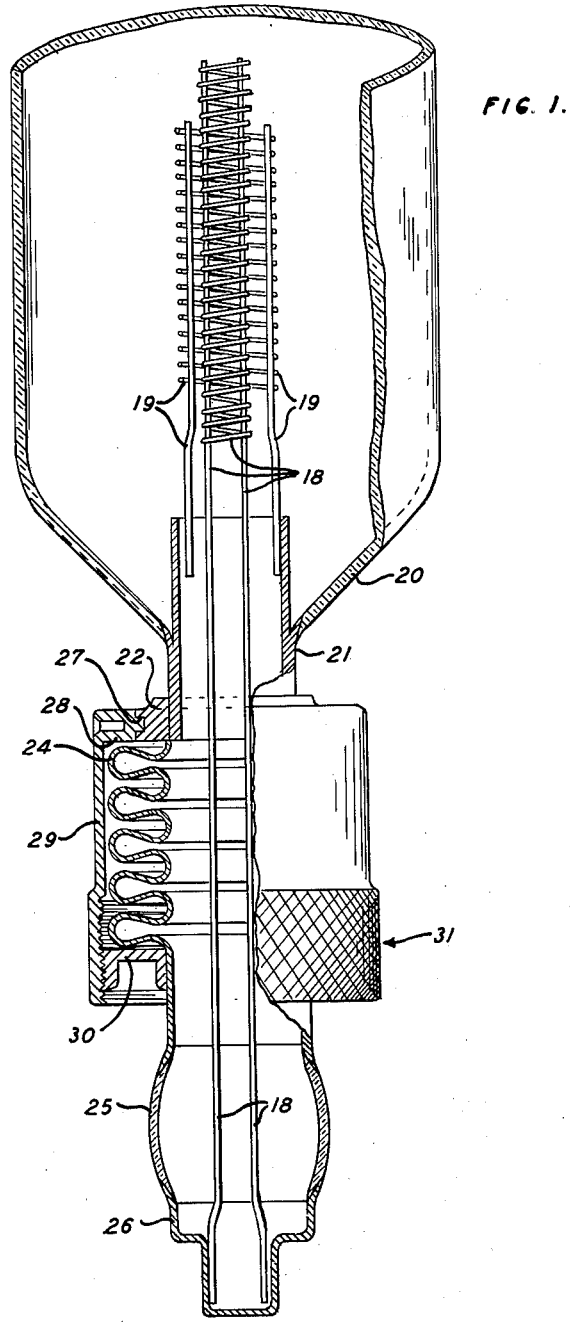
Fig. 1 is a diagrammatic broken view partly in section of a vacuum tube constructed in accordance with the invention.

In the embodiment of the invention disclosed in Fig. 1, a vacuum tube comprises a hollow glass body 20 having a tubular metallic extension 21 sealed rigidly thereto. A metal collar 22 is rigidly sealed on the outer surface of the outer end of the extension 21, e. g., by soldering, brazing or the like, and one of the elements 19 of the tube is mounted within the body 20 on the inner portion of the extension 21.

A circumferentially deeply corrugated and therefore variously distortable metal tube or Sylphon 24 has its inner or upper end rigidly sealed to the outer or lower face of the collar 22 and has its outer or lower end rigidly sealed to a glass insulating tube 25. A metal cap 26 is rigidly sealed to and closes the outer end of the tube 25 and thus also the body 20. A second element 18 of the tube is mounted on the cap 26 and extends up into the body 20 to stand adjacent to and to coact electrically with the element 19, passing without contact through the glass tube 25 and the Sylphon tube 24.

The stationary collar 22 has an outer peripheral groove 27 which receives a complementary annular tongue formed on a rotatable collar 28 encircling the collar 22, and formed integrally within the upper end of a hollow cylinder 29, which surrounds the Sylphon 24 and is formed on the inner side of its lower portion with a screw thread. This thread is engaged by the correspondingly threaded outer periphery of a collar 30 which encircles and is rigidly secured to the lower end of the Sylphon. The outer surface of the lower portion of the adjusting cylinder or sleeve 29 may be knurled for convenience of manipulation, as at 31.

Figure 2:
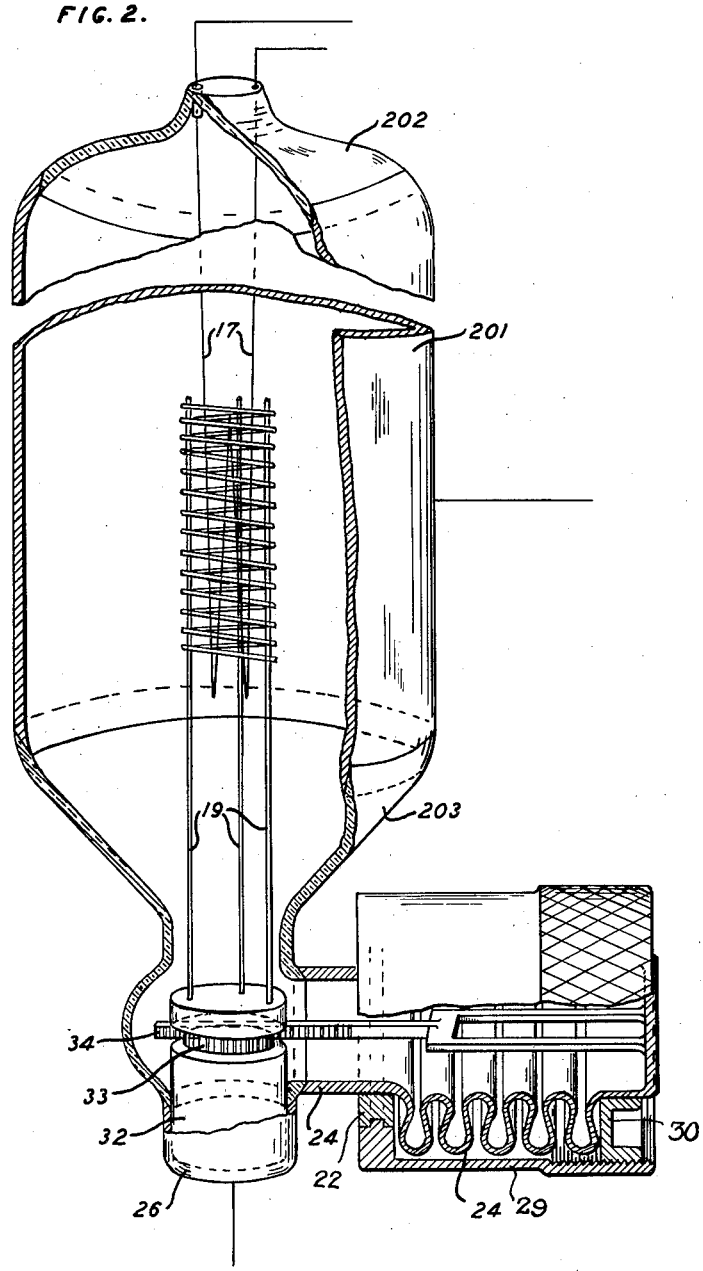
Fig. 2 is a similar view of another form thereof.

It is to be noted that the element 19 of Fig. 1 is presumed to be identically like that of Fig. 2 in structure, but only two of its three upright legs are shown because of the section.

The purpose of the arrangement disclosed in Fig. 1 is to enable adjustment of the element 18 by vertical displacement with respect to the body and hence with respect to the stationary element 19. This may be accomplished by rotating the sleeve 29 compelling the collar 30 to approach toward or recede from the collar 22, thus by distortion contracting or expanding the Sylphon tube 24 and moving the element 18 correspondingly up or down.

In the embodiment disclosed in Fig. 2, a vacuum tube has a composite, hollow, evacuated body consisting of a metal cylindrical portion 201 with glass ends 202 and 203 rigidly sealed thereto. An element 17 of the tube is suitably mounted in the glass cap 202 and extends stationarily down within the body of the tube. Another element 19 of the tube extends upwardly within the body of the tube to be adjacent to and to coact electrically with the element 17.

The element 19 is mounted on a metal cylinder 32 which fits snugly but with freedom to rotate in the metal cap 26 which is rigidly sealed to and closes the tubularly extended lower portion of the glass cap 203.

The open left end of a horizontally disposed Sylphon 24 is rigidly sealed into and communicates through the side of the tubularly extended cap 203, and has its right end integrally closed. Collars 22 and 30 and adjustment sleeve 29 are mounted externally on the Sylphon as in Fig. 1.

The cylinder 32 on which the element 19 is mounted is formed with a circumferential groove in the bottom of which is a pinion 33 engaged by a rack 34 rigidly secured to the inner face of the closed end of the Sylphon.

Thus rotation of the sleeve 29 effects reciprocation of the rack 34 and hence rotation of the cylinder 32. Thus the element 19 carried by the cylinder 32 may be rotatably adjusted relatively to the stationary element 17.

Figure 3:
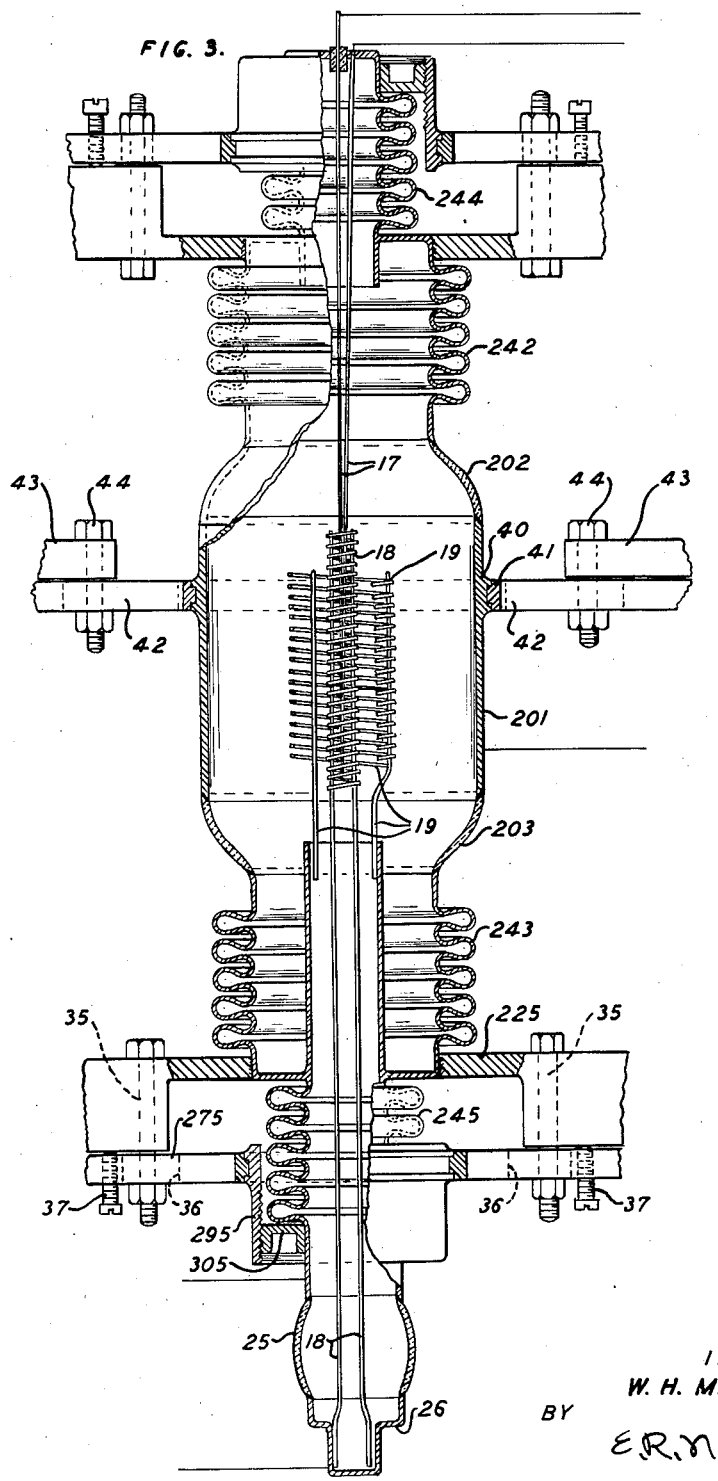
Fig. 3 is a similar view of a third form.

In the embodiment disclosed in Figs. 3 and 4, a vacuum tube has a hollow, evacuated composite body consisting of a metal cylinder 201 with glass end caps 202 and 203. A Sylphon 242 has its open lower end sealed rigidly into and communicating through the glass cap 202, and a second Sylphon 244 has its open lower end rigidly sealed into and communicating through the otherwise closed upper end of the Sylphon 242. A third Sylphon 243 has its upper open end rigidly sealed into and communicating through the lower glass cap 203, and a fourth Slyphon 245 has its upper open end sealed into and communicating through the otherwise closed lower end of the Sylphon 243. A glass insulator tube 25 is rigidly sealed at its upper end to the open lower end of the Sylphon 245 and has its lower end rigidly sealed to and closed by a metal cap 26.

The element 17 of the tube is mounted rigidly in the closed upper end of the Sylphon 244, the element 18 is rigidly mounted on the cap 26, and the element 19 is mounted on a tubular upward extension of the lower end of the Sylphon 243 which is also therefor an extension of the upper end of the Sylphon 245.

The lower end of the Sylphon 243 is rigidly secured externally in a stationary support 225, thus making the lower end of 243 and the upper end of 245 rigidly stationary. A collar 305 is secured externally on the lower end of 245 and is threaded to coact with the internally threaded adjustment sleeve 295 which is rotatable in the disk 275. The disk 275 is supported on the members 225 by bolts which pass through slots in the disk 275 and thus permit the disk to be shifted laterally on the support 225. Set screws 37 in the disk and bearing against the member 225 may be used to tilt the disk 275 at a small and adjustable angle to the member 225.

Since a Sylphon has a considerable degree of lateral flexibility, the Sylphon 245 which supports the element 18 permits the latter to be moved vertically up and down by manipulation of the sleeve 295, to be tilted by adjustment of the set screws 37, and to be shifted bodily horizontally as well as rotated to a small extent by shifting the disk 275 on the support 225.

A moment's inspection will show that the construction at the upper end of the vacuum tube is substantially the same, so that by similar means the element 17 may be moved up and down, bodily horizontally, tilted or rotated.

The metal part 201 of the body of the tube is thickened and grooved peripherally at 40 and is encircled by a correspondingly tongued collar 41 carried on arms or a disk 42 supported by a stationary member or members 43, the disk 42 being slotted around the bolts 44 to permit of lateral bodily displacement of the cylinder 201, made possible by the flexibility of the Sylphons 242 and 243. As the cylinder 201 may well be made to function as an electrical element of the vacuum tube, this last adjustability may be of importance.

Considering the three embodiments disclosed and the possible combinations of element mountings in or in connection with Sylphone tubes, it is evident that an element of a tube may thus be mounted and arranged to have substantially any kind of adjustability relatively to another element.

The invention is therefore not limited to the precise embodiments disclosed, but is limited only by the appended claim.

What is claimed is:

A vacuum tube having a hollow evacuated body, a corrugated metal distortable tube sealed to and communicating with the interior of the body, a rotatable support within the body, an electrical element mounted on the support, means connecting the support to the metal tube to rotate the support when the metal tube is distorted, and external means to distort the metal tube and thereby rotate the support and the element.

WILLIAM H. MANTHORNE.